(12) United States Patent
Girard et al.

(10) Patent No.: US 9,121,523 B2
(45) Date of Patent: Sep. 1, 2015

(54) SPRING-CAPTURE ASSEMBLY FOR A SPRING-BIASED MECHANISM AND PRESSURE RELIEF VALVE INCLUDING SAME

(75) Inventors: Tim Girard, Vero Beach, FL (US); Michael Fernandez, Keansburg, NJ (US); Chris Lynch, Landing, NJ (US); Joseph Petrarca, Sparta, NJ (US)

(73) Assignee: Girard Equipment, Inc., Manalapan, NJ (US)

(*) Notice: Subject to any disclaimer, the term of this patent is extended or adjusted under 35 U.S.C. 154(b) by 989 days.

(21) Appl. No.: 13/155,846

(22) Filed: Jun. 8, 2011

(65) Prior Publication Data

US 2012/0313030 A1    Dec. 13, 2012

(51) Int. Cl.
| | |
|---|---|
| *B08B 7/00* | (2006.01) |
| *F16K 43/00* | (2006.01) |
| *F16K 15/02* | (2006.01) |
| *F16K 17/04* | (2006.01) |

(52) U.S. Cl.
CPC .............. *F16K 43/00* (2013.01); *F16K 15/025* (2013.01); *F16K 17/042* (2013.01); *F16K 17/0413* (2013.01); *Y10T 29/49815* (2015.01)

(58) Field of Classification Search
CPC ..... F16K 17/0466; F16K 17/06; F16K 17/04; F16K 17/0413; F16K 17/042; F16K 43/00; Y10T 29/49815
USPC .............. 137/469, 522, 523, 530, 15.01, 315, 137/528, 540; 251/77, 83; 267/168
See application file for complete search history.

(56) References Cited

U.S. PATENT DOCUMENTS

| 291,818 | A | * | 1/1884 | Tudor ............................ 237/67 |
| 1,480,155 | A | * | 1/1924 | Darling ......................... 137/522 |
| 3,944,196 | A | | 3/1976 | Schwartzkopf |
| 5,203,372 | A | | 4/1993 | Freiler |
| 6,234,194 | B1 | * | 5/2001 | Jainek et al. .................. 137/375 |

FOREIGN PATENT DOCUMENTS

| WO | 01/42696 A1 | 6/2001 |
| WO | 03/071174 A1 | 8/2003 |

OTHER PUBLICATIONS

International Preliminary Report on Patentabilitly, dated Dec. 10, 2013, issued in corresponding International Application No. PCT/US2012/041543.

* cited by examiner

*Primary Examiner* — Kevin Lee
*Assistant Examiner* — P. Macade Nichols
(74) *Attorney, Agent, or Firm* — Saul Ewing LLP; Stephen J. Driscoll

(57) ABSTRACT

A spring capture assembly is provided for securing a compression spring of a spring-biased mechanism, such as a spring-biased pressure relief valve, to permit disassembly of the mechanism without risk of damage or injury associate with rapid resiling of the spring from a compressed state. The assembly includes a tool, a housing having an opening for admitting passage of the tool and capturing the spring at one end, a spring retainer, and a compression spring mounted within the housing and captured at one end by said housing and toward an opposite end by the spring retainer. The tool is adapted for mating with the spring retainer and the housing to compress the spring therebetween. The spring capture assembly may be incorporated into a pressure relief valve for venting pressure and/or vacuum from a pressure vessel. Provided also is a method for disassembling a spring-biased mechanism including a spring capture assembly.

24 Claims, 12 Drawing Sheets

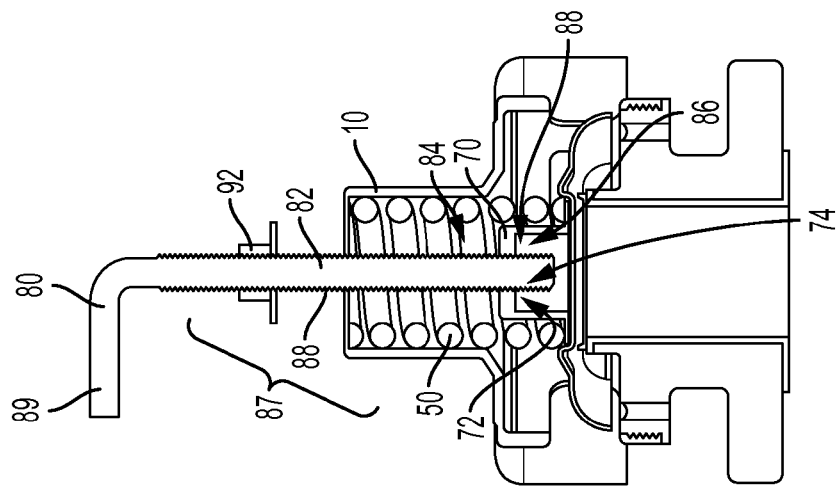
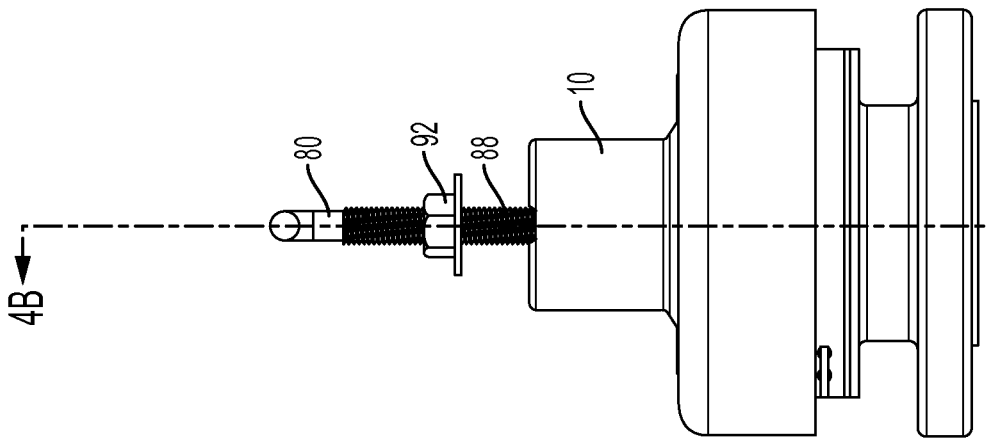

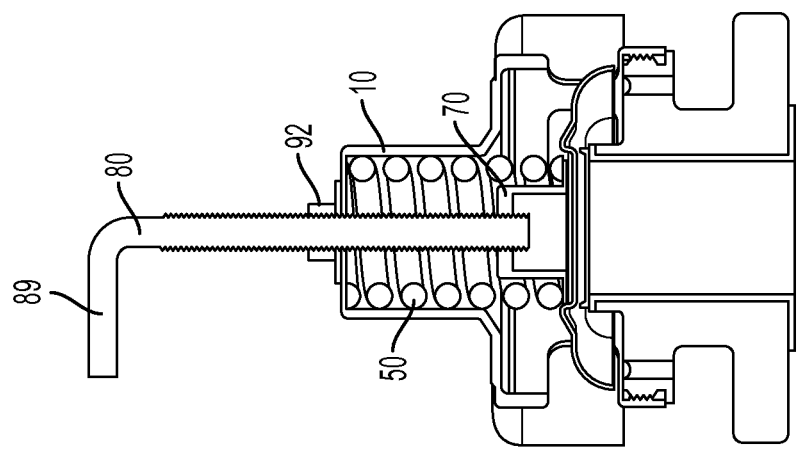
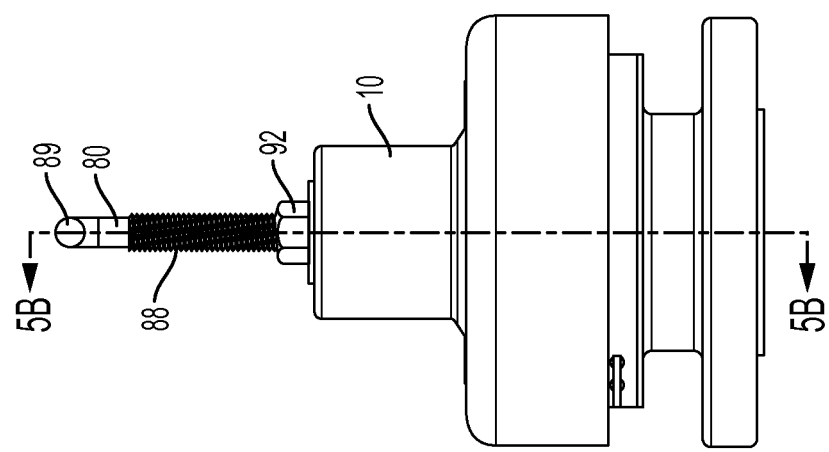
FIG. 5B
FIG. 5A

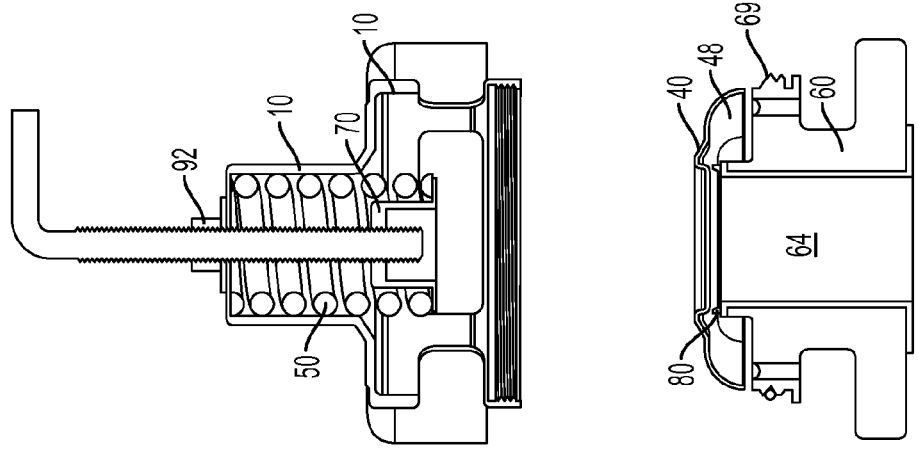
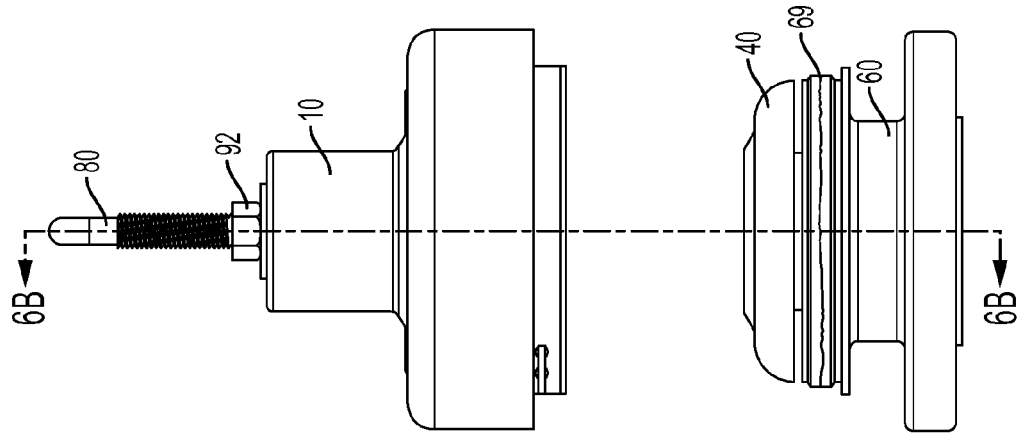

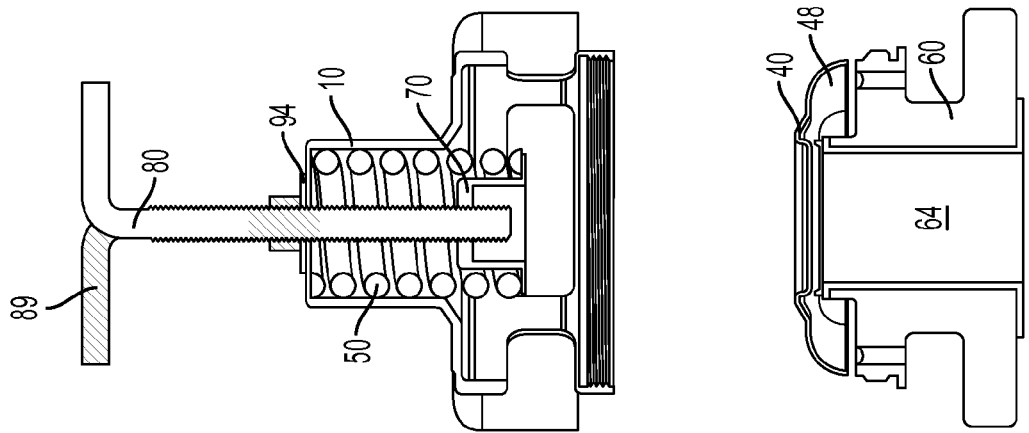
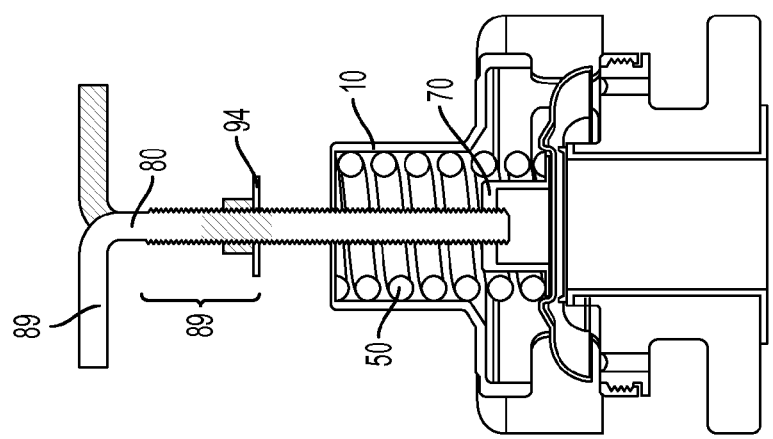

US 9,121,523 B2

SPRING-CAPTURE ASSEMBLY FOR A SPRING-BIASED MECHANISM AND PRESSURE RELIEF VALVE INCLUDING SAME

FIELD OF INVENTION

The present invention relates generally to a spring-capturing assembly in a spring-biased mechanism, such as a valve including a spring-biased poppet, and more particularly to a pressure relief valve for a pressure vessel for containing a pressurized fluid, such as an over-the-road tank trailer, that includes such a spring-capture assembly, which allows for safe and easy disassembly of the valve in the field for cleaning or other purposes.

DESCRIPTION OF THE RELATED ART

As known to those skilled in the art, an over-the-road tank trailer is a mobile pressure vessel, typically pulled behind a truck or tractor, for containing a fluid during transportation from one point to another. Such contained fluids can be pressurized fluids or unpressurized fluids, however, the un-pressurized fluids may become pressurized due to heating of the tank by the sun which in turn heats the fluid contained in the tank causing it to be pressurized. Also, during an emergency situation, such as upon the over-the-road tank trailer becoming heated in a fire, the fluid contained in the tank can become heated and pressurized.

A common prior art pressure relief vent for an over-the-road tank trailer includes a housing mounted on the top of the tank trailer including a valve seat that is normally engaged by a poppet forced into sealing engagement with the valve seat by a compression spring mounted in the housing and providing downwardly-acting force on the poppet. The underside of the poppet is exposed to the pressurized fluid in the tank and the pressurized fluid in the tank provides an upwardly acting force on the underside of the poppet. As is still further known to those skilled in the art, the compression spring is preloaded such that the downwardly acting force provided by the spring on the poppet is sufficient to maintain the poppet in sealing engagement with the valve seat up to a set pressure in opposition to any upwardly acting force applied to the underside of the poppet by the pressurized fluid. As is still further known, the compression spring must be chosen such that upon the fluid in the over-the-road tank trailer becoming over-pressurized to the flow pressure the compression spring will compress sufficiently upwardly to permit the poppet to be lifted up off of the valve seat by the force created by the over-pressurized fluid a distance sufficient to provide a space or opening, typically an annular space or opening, between the valve seat and the poppet sufficiently large to permit the over-pressurized fluid to flow therethrough at a desired flow rate.

As is still further known, compression springs are characterized by what is known as a spring constant, which reflects the distance the spring will compress upon the application thereto of a given force. Accordingly, as is still further known, the spring constant for the compression spring of a pressure relief vent is the difference between the flow pressure and the set pressure in pounds per square inch times the area of the poppet in square inches, divided by the distance in inches between the valve seat and the poppet required to provide the above-noted flow rate. A general characteristic of compression springs, as is known, is that the higher the spring constant the stiffer the spring.

As is still further known, applicable regulations require that the pressure relief vent for an over-the-road tank trailer be mounted on the tank trailer as close as possible to the top center of the tank trailer so that the pressure relief vent is exposed to the vapor space inside the tank trailer, with such vapor space, as is known, being the space between the fluid contained in the tank trailer and the top of the tank trailer. As is further known the height of the pressure relief vent is determined largely by the height or length of the compression spring.

Since the pressure relief vent must be mounted on the top center of the over the road tank trailer, it is desirable that the height of the pressure relief vent be as small as possible to permit the over-the-road tank trailer with the pressure relief vent mounted on top to safely pass under overhead structures such as bridges and the like with adequate clearance while maintaining the required flow rate. This means that the length or height of the compression spring of the pressure relief vent must be as small as possible and yet the compression spring, as noted above, must be sufficiently stiff to maintain the poppet in sealing engagement with the valve seat at the set pressure and which spring must be sufficiently un-stiff that it will compress sufficiently at the flow pressure to permit the poppet to be moved away from the valve seat a distance sufficient to provide the above-noted flow rate. Obviously, as known to those skilled in the art, these two spring requirements are in conflict with each other because, generally speaking and as is further known, the higher or longer the compression spring the lower the spring constant and the shorter the spring the higher the spring constant. Accordingly, to obtain a relatively shorter height valve, stiffer springs are generally desired.

A certain prior art valve is disclosed is commonly assigned U.S. Pat. No. 5,203,372, the entire disclosure of which is hereby incorporated herein by reference. This valve is adapted to include a poppet having a predetermined shape for forming an escaping stream of over-pressurized fluid into a jet stream that provides a reaction force that acts against the underside of the poppet to assist the over-pressurized fluid in lifting the poppet off of the valve seat upon occurrence of over-pressurization. This increased upward force in turn allows for use of a relatively stiffer, and shorter, spring, and advantageously provides a valve with a relatively lower height.

Because of the relatively high degree stiffness of the springs in such valves, a mechanical press is typically required to compress the spring during routine cleaning of the valve, namely the surfaces of the poppet in communication with the pressurized fluid, e.g, between hauls of different pressurized fluids. Thus, it is typically necessary to remove the valve from the tank, climb down from the truck, and transport the valve to a hydraulic or other mechanized press (which is heavy ground-mounted equipment). This is inconvenient and time-consuming. Further, because of the stiffness of the spring, it would be impractical to provide a valve that could be disassembled manually, without the use of a mechanized press, because as soon as the housing would be disassembled, the stiff spring would rapidly decompress and tend to turn the decoupled housing parts into projectiles, which could result in damage to the valve or other equipment, and poses a risk of serious harm to service technicians. It is noted that a similar concern exists in spring-biased mechanisms other than valves that also require use of relatively stiff springs, and where manual disassembly is desirable.

What is needed is a safety assembly adaptable to a broad range of spring-biased mechanisms that would allow for safe disassembly of the spring-biased mechanism without safety risks associated with decompression of the spring during disassembly.

BRIEF DESCRIPTION OF THE DRAWINGS

The present invention will now be described by way of example with reference to the following drawings in which:

FIGS. 4A and 4B are elevational and cross-sectional views of the valve of FIG. 1, shown mated with a spring compression tool, and before compression of the spring;

FIGS. 5A and 5B are elevational and cross-sectional views of the valve of FIG. 1, shown with a nut advanced against a housing in position to compress the spring;

FIGS. 6A and 6B are elevational and cross-sectional views of the valve of FIG. 1, shown mated with a spring compression tool, and after compression of the spring, and showing the frame and spring assembly removed from the tank mount;

FIGS. 7A and 7B are cross-sectional views of the valve of FIG. 1 shown mated with an alternative embodiment of a spring compression tool;

SUMMARY

Figure 2:
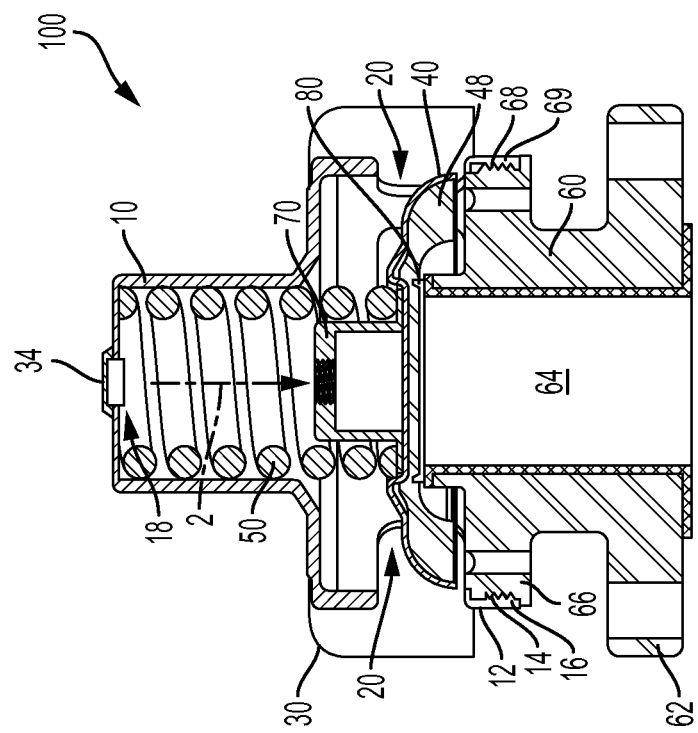
FIG. 2 is a cross-sectional view of the pressure relief valve of FIG. 1, taken along line A-A of FIG. 1.

The present invention provides a safety assembly in the form of a spring-capture assembly, a pressure relief valve including a spring-capture assembly, and a method for disassembling a spring-biased mechanism, such a pressure relief valve. The spring capture assembly permits disassembly of the spring-biased mechanism, e.g., for cleaning or maintenance purposes, without risk of damage or injury associated with rapid resiling of the spring from a compressed state. Accordingly, a relatively stiffer spring may be used without fear of injury, which advantageously allows for a shorter height in over-the-road tank trailer valves, and permits manual valve disassembly in the field by a service technician atop a tank trailer, using no more than common hand tools.

A spring capture assembly for a spring-biased mechanism includes a tool having an elongated member and a distal end, and a housing having an opening for admitting passage of the tool. The assembly further include a spring retainer configured to mechanically interlock with the tool, e.g. via complementary threads. A compression spring is mounted within the housing and captured at one end by the housing and toward an opposite end by the spring retainer. The tool may include a fixed shoulder, such that rotation of the tool relative to the spring retainer, with the tool mated to the spring retainer and the shoulder abutting the housing, advances the spring retainer onto the tool and acts to compress the compression spring between the spring retainer and the housing. Alternatively, the tool may include a nut supported on threads instead of a shoulder. In such an embodiment, rotation of the nut relative to the elongated member, with the tool mated to the spring retainer and the nut abutting the housing, withdraws the tool relative to the housing and acts to compress the compression spring between the spring retainer and the housing.

Provided also is a pressure relief valve for venting a pressure vessel containing a pressurized fluid. The valve includes a mount having a lower portion adapted for mounting to the pressure vessel, a passageway for venting fluid therethrough, and an upper portion defining a first mating structure circumscribing the passageway. The valve further includes a valve seat supported on the mount about the passageway, and a poppet matable with the valve seat to occlude the passageway and disrupt a flow of fluid therethrough. Further still, the valve includes a housing having a first portion defining a second mating structure complementary to the first mating structure, and an opening for admitting passage of a tool, and a spring retainer having a mating structure mechanically interlockable with the tool, and a flange. The valve further includes a compression spring mounted within the housing and captured at one end by the housing and at an opposite end by the flange of the spring retainer. The compression spring biases the poppet from an open position spaced from the valve seat toward a closed position in abutting relationship with the valve seat. The tool is an elongated member having a distal portion dimensioned to pass through the opening of the housing. The tool has a distal portion having a distal end matable with the mating structure of the spring retainer to compress the compression spring between the spring retainer and the housing.

Also provided is a method for disassembling a spring-biased mechanism having a spring capture assembly for capturing a compression spring of the mechanism. The method includes manually grasping an elongated tool having a distal end, inserting the distal end of the tool through a housing of the spring capture assembly, mating the distal end of the tool with a spring retainer of the spring capture assembly, manipulating the tool to draw up the spring retainer and compress the compression spring between the spring retainer and the housing; and disassembling the spring-biased mechanism.

The spring-capture assembly allows for safe disassembly of a valve (or other spring-biased mechanism) without the safety risks associated with decompression of the spring during disassembly.

DETAILED DESCRIPTION

The present invention provides a safety assembly in the form of a spring-capture assembly. The spring-capture assembly is adaptable to a broad range of spring-biased mechanisms, including a pressure relief valve. The spring-capture assembly allows for safe disassembly of the valve (or other spring-biased mechanism) without the safety risks associated with decompression of the spring during disassembly. As applied to a pressure relief valve, the spring-capture assembly advantageously permits a multi-piece valve construction that can be manually disassembled safely for poppet/valve cleaning purposes in the field, namely, by a service technician on the top of an over-the-road tank trailer, using common hand tools, without the need for a mechanized press or other heavy ground-based equipment.

Figure 1:
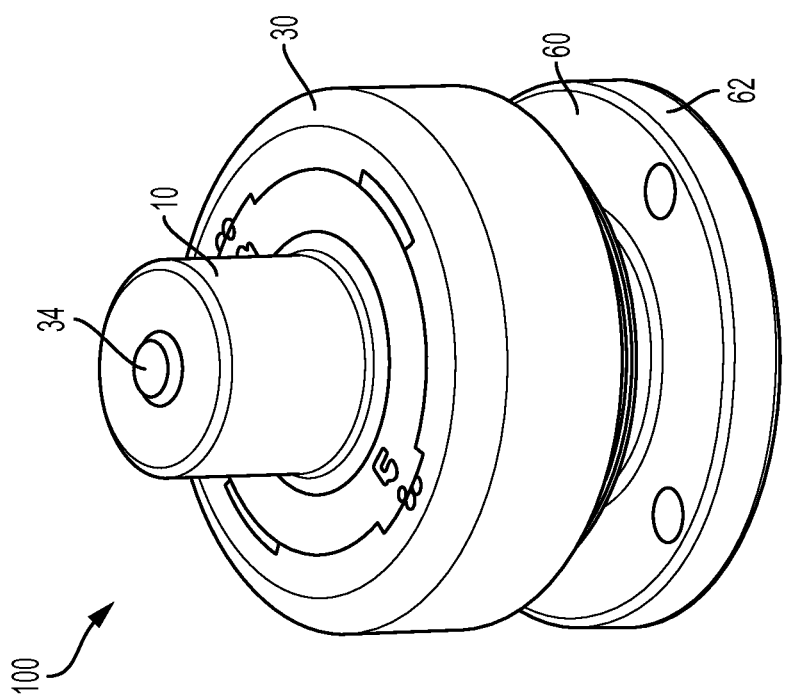
FIG. 1 is a perspective view of a pressure-relief valve in accordance with an exemplary embodiment of the present invention.
Figure 3:
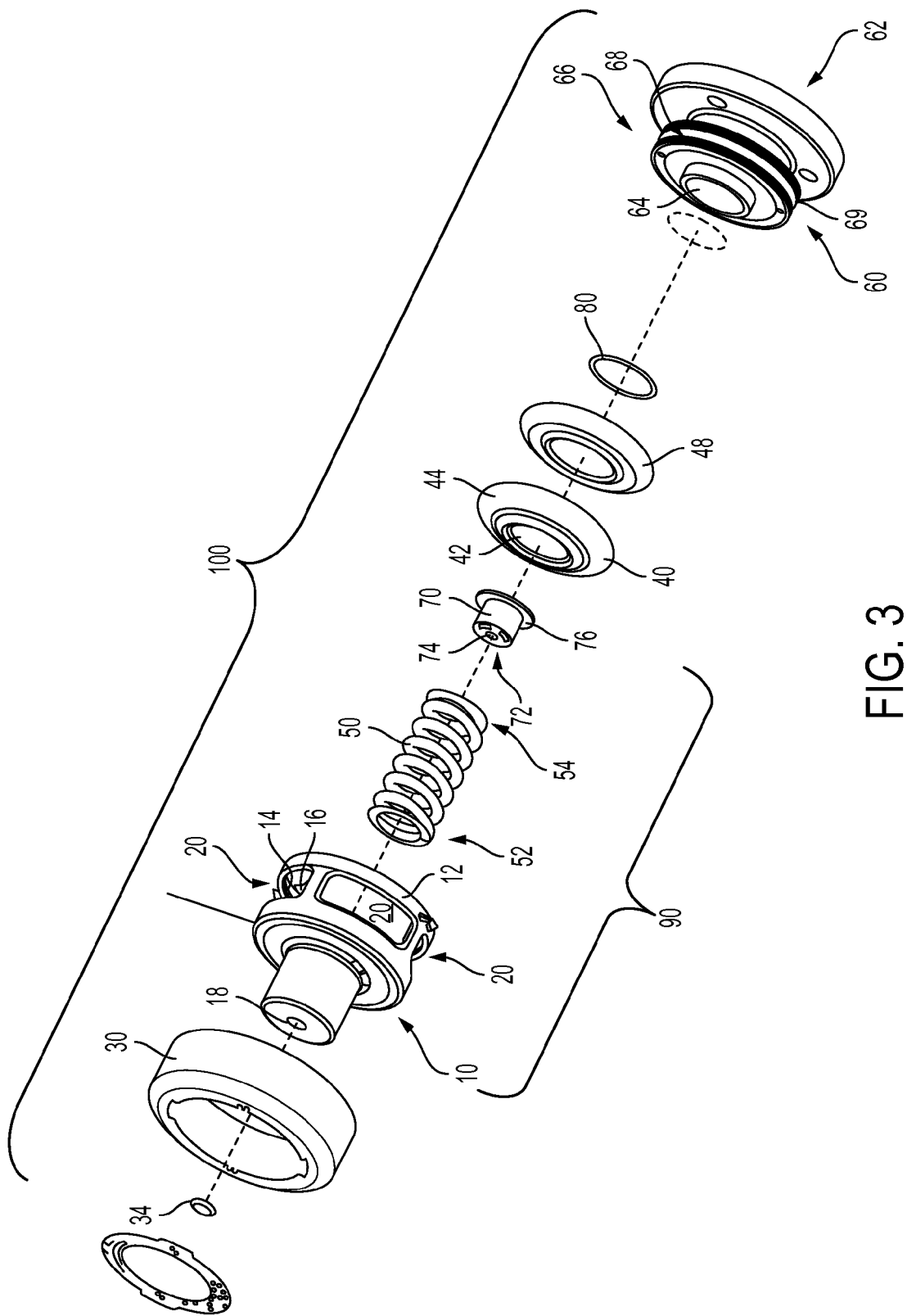
FIG. 3 is an exploded view of the pressure relief valve of FIG. 1.

Referring now to FIGS. 1-3, an exemplary pressure-relief valve including an exemplary spring-capture assembly is shown. This exemplary valve is useful in venting over-pressurized pressure vessels such as, for example, an over-the-road tank trailer. As shown in FIG. 1, the valve 100 is of a multi-piece, readily-disassemblable construction including an upper housing 10 and a lower mount 60.

The mount 60 may have various forms, and its lower portion 62 may be substantially conventional in nature. By way of example, the lower portion 62 of the mount 60 may be adapted for sealably mounting to a pressure vessel, such as an over-the-road tank trailer, by welding or mechanical fasteners, and defines a generally centrally-located passageway 64 for venting fluid therethrough. Of particular note, and in accordance with the present invention, the mount 60 includes an upper portion 66 defining a first mating structure 68 that generally circumscribes (or surrounds) the passageway 64. The first mating structure 68 may have any suitable configuration provided that it is capable of serving to mate with and readily releasably secure thereto, e.g. through the use of no more than common hand tools and without a need for a mechanized press or other ground-based equipment, the housing 10. As best shown in FIGS. 2 and 3, in this exemplary embodiment, the first mating structure 68 comprises external threads 69. By way of example, the first mating structure could alternatively include internal threads. Though other mating structures could be used, complementary threads are preferred for mating the mount and housing 10, because the threads allow for mating with relatively more or relatively less compression of the spring, which adjusts the set pressure (at which spring force is overcome to cause venting).

A valve seat 80 is supported on upper portion 66 of the mount 60 in position so as to circumscribe, and not to occlude, the passageway 64, in position to mate with a poppet. By way of example, the valve seat 80 may be provided as a suitable elastomeric O-ring extending around the passageway 64, as shown in FIGS. 2 and 3.

The housing 10 has a lower portion 12 defining a second mating structure 14 complementary to the first mating structure 68 of the mount 60. The second mating structure 14 may have any suitable form, provided that it provides a secure, but readily releasable, mounting to the mount 60 that resists axial separation of the housing 10 and mount 60. In this exemplary embodiment, the second mating structure comprises internal threads 16 complementary to the external threads 69 of the mount 60.

Further, the housing 10 defines an opening 18 for admitting passage of a tool, for purposes discussed below. The opening 18 is located generally toward the center ("centrally located") of the housing, or toward the center of a spring, as discussed below, and as shown in FIGS. 2 and 3. Further still, the housing 10 is provided with openings 20 for venting pressurized fluid (such as air, gas, or vapor, collectively referred to herein as "fluid").

In this embodiment, the valve 100 further includes a rain shield 30, and a hole plug 34 dimensioned to fit snugly yet removably within the opening 18 of the housing 10 so as to substantially occlude the opening, and thus thwart entry of rainwater or other contaminants.

The valve 100 further includes a movable poppet 40 matable with the valve seat 80 to occlude the passageway 64 and disrupt a flow of fluid therethrough. The poppet 40 includes a central portion 42 for abutting the valve seat and selectively occluding the passageway 64. Though optional, in this example, the poppet 40 includes a stick-resistant layer on its underside, to avoid bonding with the valve seat 80. In this example, the poppet includes a formed body 44 constructed of stainless steel, and the stick-resistant layer is provided as a unitary body 48 of PTFE liner machined to conform to the poppet.

The valve 100 further includes a compression spring 50 mounted within the housing 10. The compression spring 50 is positioned within the housing such that its first end 52 abuts and/or is braced against the housing 10, and its second (opposite) end 54 is braced against the poppet 40. When assembled, the compression spring 50 is preloaded, such that it exerts downwardly acting force, indicated by arrow Z in FIG. 2, against the poppet 40, to urge the poppet 40 into sealing engagement with the valve seat 80 on the mount.

In accordance with the present invention, the valve 100 further includes a spring retainer 70 configured to be matable with the tool to compress the spring 50 within the housing 50, so as to relieve downward force otherwise exerted by the spring 50 on the poppet 40. In the exemplary embodiment shown, the spring retainer 70 is configured with an opening 72 having internal threads 74 for mating with the tool. In an alternative embodiment, the spring retainer may have other structures, such as a post bearing external threads for mating with the tool, or a hook, loop, latch or other structure for mating with the tool to permit upward (as shown in the figures) pulling on the spring retainer 70 to compress the spring 50. In this exemplary embodiment, the spring retainer includes a generally radially-extending flange 76 dimensioned to capture the second end 54 of the spring 50, and the spring retainer is positioned between the spring and the poppet 40. Alternatively, the spring retainer 70 could have other structure, grasp the spring other than at its end, and be positioned to capture the spring at a point other than between the compression spring and the poppet.

Thus, the spring 50 is captured between the spring retainer 70 and the housing 10, and in a normal condition, the spring 50 biases the poppet 40 from an open position spaced from the valve seat 80 (to permit venting of fluid via the passageway 64) toward a closed position in abutting relationship with the valve seat 80 (to thwart venting of fluid via the passageway 64).

It will be understood that the compression spring 50 is chosen to have a stiffness sufficient to cause the spring 50 to exert sufficient downwardly-acting force to maintain the poppet 40 in sealing engagement with the valve seat 80 up to a set pressure of the valve 100.

In use, the exemplary valve shown in FIGS. 1-3 is operable to effectively seal a pressure vessel until fluid contained in the pressure vessel has become over-pressurized sufficiently in excess of the set pressure of the valve 100 to produce an upwardly-acting force that acts against the central underside portion of the poppet 40 (upon liner 48) with sufficient force to overcome the downwardly-acting force applied against the poppet 40 by the compression spring 50 and thus to lift the poppet 40 up off of the valve seat 80. Upon the poppet 40 being lifted up off of the valve seat, the over-pressurized fluid escapes or is vented outwardly through the openings 20 in the housing 10.

Further, in accordance with the present invention, the valve may be easily and safely disassembled, e.g., by a field technician atop an over-the-road tank trailer using simple, lightweight common hand tools such as a soft mallet, screwdriver and/or a combination or other wrench, by virtue of the valve's inclusion of a spring capture assembly 90 in accordance with the present invention, as is illustrated with reference to FIGS. 4A-7B. It should be noted, after the tool is used to capture the spring and relieve spring biasing on the poppet, the associated spring tension placed by the spring on the threads of the mount and housing is relieved, and thus the mount and housing are loosely coupled and may be easily decoupled by hand. Such disassembly is required periodically for service and/or cleaning, e.g., between fillings of the pressure vessel with different fluids.

Referring now to FIGS. 3-7B, it is illustrated that the exemplary spring capture assembly 90 includes at least the housing 10, spring 50, spring retainer 70, and a tool 80 configured to mate and cooperate with the spring retainer 70 to compress the spring 50 within the housing 10.

The tool 80 is an elongated member having an elongated body 82 having a distal portion 84 dimensioned to pass through the opening 18 of the housing 10. The distal portion 84 has a distal end 86 matable with the spring retainer 70. The spring retainer and tool may include any suitable complementary structure for mating purposes, provided that the spring retainer and tool are mechanically interlockable to resist substantial relative motion away from each other in an axial direction of the tool, as the tool is used to draw up the spring retainer and compress the spring between the spring retainer and the housing. Preferably, the tool 80 further includes a handle 89 extending generally transversely to the elongated body 82, and thus such a tool 80 is generally L-shaped (FIGS. 4A-6B) or T-shaped (FIGS. 7A-7B).

In the exemplary embodiment shown in FIGS. 1-7B, the centrally-located opening 72 of the spring retainer 70 is provided with internal threads 74. Accordingly, the distal end 86 of the tool 80 comprises external threads 88 complementary thereto. In the embodiment shown in FIGS. 4A-6B, the proximal end 90 of the tool 80 also comprises external threads 88 supporting a complementarily threaded nut 92.

In an alternative embodiment, the tool 80 does not include such external threads on its proximal end, or a nut, but instead includes a radially-extending shoulder 94 for abutting the housing that acts as a stop, as shown in FIGS. 7A and 7B. Unlike the nut, the shoulder 94 is fixed relative to the body 82, such that the tool 80 can not be advanced any further into the housing 10 after the shoulder abuts the housing 10.

In use, the tool 80 is operable is operable to mate with the spring retainer 70 and draw up the spring retainer 70 to compress the compression spring 50 between the spring retainer 70 and the housing 10. By way of example, the embodiment of the tool 80 shown in FIGS. 4A-6B may be used as follows to disassemble a valve having a spring capture assembly 90 for capturing a compression spring biasing a poppet of the valve. First, the hole plug 34 is removed from the opening 18 of the housing 10, if necessary, to clear the opening. Then, the elongated tool 80 having a distal end 86 is manually grasped. Next, the method involves inserting the distal end 86 of the tool 80 through the housing 10 of the spring capture assembly 90. Next, the method involves mating the distal end 86 of the tool 80 with the spring retainer 70 of the spring capture assembly 90, e.g. by threading together the spring retainer 70 and tool 80, as shown in FIGS. 4A and 4B. Further, the method involves manipulating the tool 80 to draw up the spring retainer 70 and compress the compression spring 60 between the spring retainer 70 and the housing 10.

Subsequently, the housing 10 may be disengaged from a pressure vessel, as shown in FIGS. 6A and 6B. By way of example, this may involve rotating the housing 10 relative to a mount 60 of the pressure vessel to decouple complementary mating structures on the mount and on the housing. This may be accomplished using a crescent or other wrench to loosen the housing from the mount, and/or by using a soft mallet and screwdriver to tap against lugs on the housing. It will be noted that because the spring is securely captured by the spring capture assembly 90, opposed axial forces on the mating structures of the housing 10 and the mount 60 are relieved, eliminating binding of the mating structures that would make decoupling difficult. Further, the spring will not resile rapidly and cause the housing 10 to "pop off" from the mount 60, thus avoiding injury to personnel during disassembly. Further still, it will be noted that after the housing/spring capture assembly 90 has been removed from the mount 60, the poppet 40 is retained loosely on the mount 60, simply resting on the valve seat (assuming that the tank trailer has already been depressurized), as shown in FIG. 6B. Accordingly, a technician may simply manually lift the poppet 40 from the valve seat 80 and clean its underside, if necessary, and/or replace the valve seat 80, if necessary. Notably, this can be accomplished using only common hand tools, and while a technician is atop a tank trailer, without the need for ground-based presses or other heavy equipment.

For embodiments in which the spring retainer 70 includes internal threads 74 and the distal end 86 of the tool 80 includes external threads, mating the distal end of the tool with the spring retainer comprises threading the tool 80 through the spring retainer 70, as shown in FIGS. 4A and 4B.

In an embodiment in which the tool 80 includes a shoulder 94 for abutting the housing 10, manipulating the tool involves threading the tool 80 through the spring retainer 70 until the shoulder 94 abuts the housing 10 (see FIG. 7A), and then continuing to thread the tool through the housing while the shoulder abuts the housing (see FIG. 7B). The continued threading causes the spring retainer to be drawn upwardly on the threads of the tool, and the compression spring 50 to be compressed as a result, as best shown in FIG. 7B. Thus, rotation of the tool relative to the spring retainer with the tool mated to the spring retainer and the shoulder abutting the housing advances the spring retainer onto the tool and acts to compress the compression spring between the spring retainer and the housing.

In an alternative embodiment in which the tool does not include a shoulder but instead includes external threads on its proximal end 89 that support a complementarily threaded nut (see FIGS. 4A-6B), manipulating the tool involves threading the tool 80 into the spring retainer 70 (see FIGS. 4A and 4B) and then advancing the nut 92 on the tool until the nut 92 abuts the housing 10 (see FIGS. 5A and 5B) and draws up the spring retainer 70 to compress the compression spring (see FIGS. 6A and 6B). The advancing of the nut 92 causes the elongated member 82 to be drawn upwardly relative to the housing (while the spring retainer remains in a substantially constant position on the member), and the compression spring 50 to be compressed as a result. Thus, rotation of the nut relative to the elongated member with the tool mated to the spring retainer and the nut abutting the housing withdraws the tool relative to the housing and acts to compress the compression spring between the spring retainer and the housing.

Figure 8:
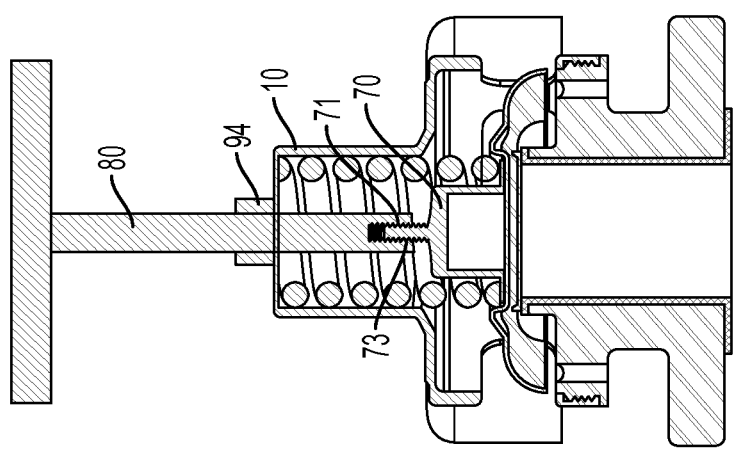
FIG. 8 is a cross-sectional view of an alternative embodiment of the valve of FIG. 1, shown with a spring retainer having an externally-threaded stud, mated with a tool having complementary internal threads, and a fixed shoulder.

In another alternative embodiment, the spring retainer 70 comprises external threads 71 on a stem 73 integral with the spring retainer 70, and the distal end of the tool 80 comprises complementary internal threads 83. In one such embodiment, the tool 80 further comprises a shoulder 94 for abutting the housing (similar to that shown in FIGS. 7A and 7B), as best shown in FIG. 8. In such an embodiment, manipulating the tool 80 involves threading the tool 80 onto the stem 73 of the spring retainer 70 while the shoulder abuts the housing 10, as best shown in FIG. 8.

Figure 9:
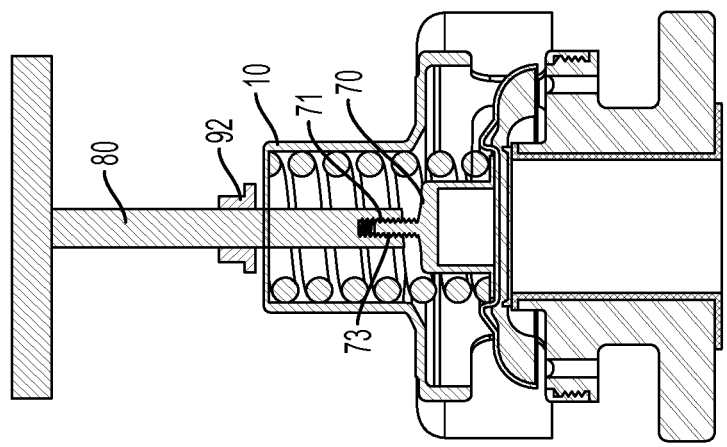
FIG. 9 is a cross-sectional view of an alternative embodiment of the valve of FIG. 1, shown with a spring retainer having an externally-threaded stud, mated with a tool having complementary internal threads, and a tool supporting a threaded nut.

In yet another alternative embodiment, the spring retainer 70 similarly comprises external threads 71 on a stem 73 integral with the spring retainer 70, and the distal end of the tool 80 comprises internal threads complementary thereto 83. However, in this alternative embodiment, a proximal end of the tool comprises external threads supporting a complementarily threaded nut 92 for abutting the housing (similar to that shown in FIGS. 4A and 6B), as best shown in FIG. 9. In such an embodiment, manipulating the tool involves threading the tool onto the spring retainer and advancing the nut on the tool until the nut abuts the housing and draws up the spring retainer to compress the compression spring.

After cleaning/service, the poppets may be replaced on the valve seat 80/mount 60, the housing 10 may be secured to the mount 60 (e.g., by threading them together), and then the tool 80 can be rotated or otherwise decoupled from the spring retainer 70 to restore spring-bias to the valve/mechanism, and to return the valve/mechanism to service. The tool 80 may then be withdrawn from the housing 10 and the hole plug 34 may be replaced in the housing's opening 18.

Figure 10:
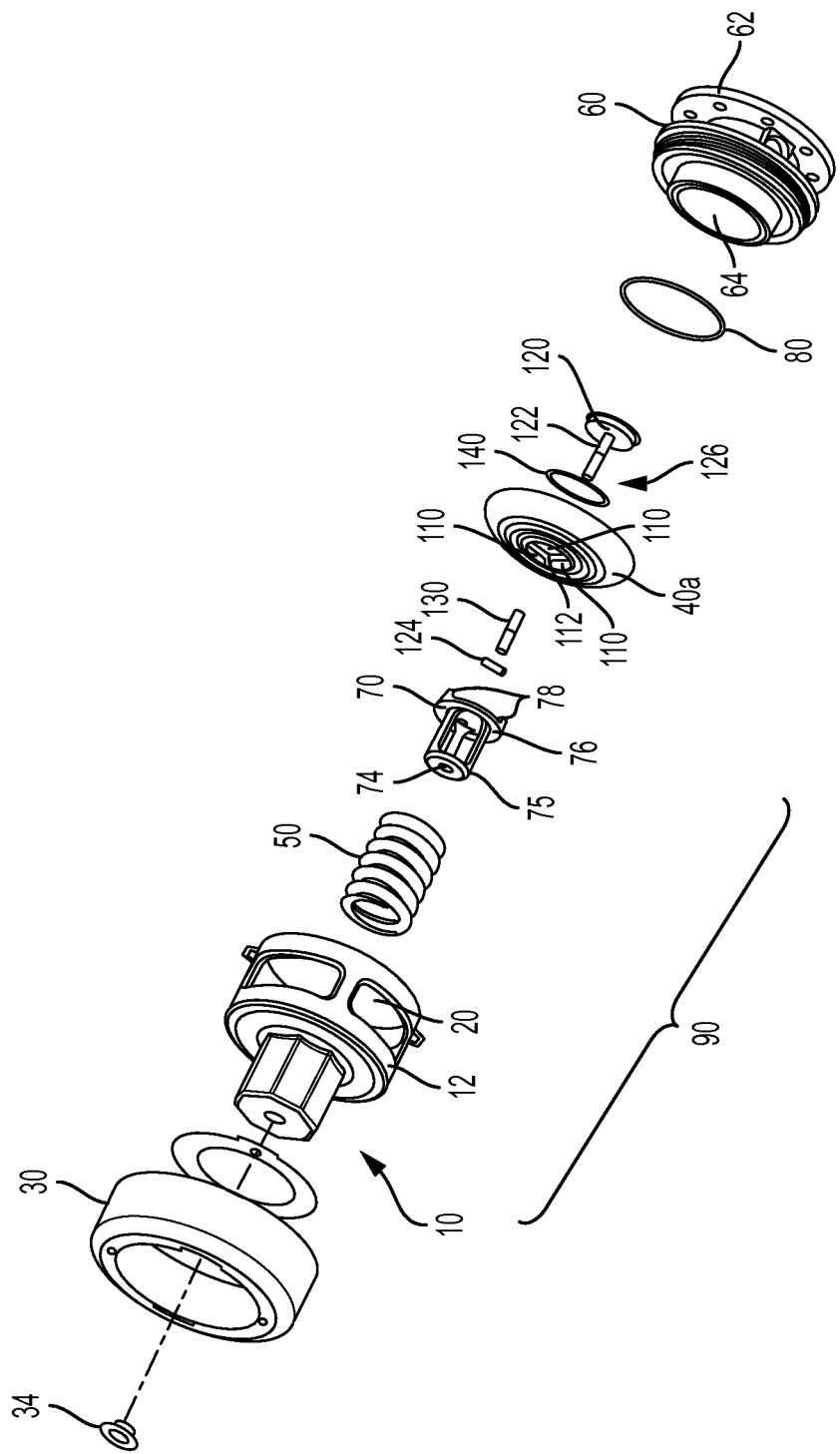
FIG. 10 is an exploded view of a pressure-relief and vacuum venting valve in accordance with an alternative exemplary embodiment of the present invention.

FIGS. 10-13B show an alternative exemplary embodiment of a valve in accordance with the present invention. This embodiment is similar to that shown in FIGS. 1-7B, but is configured as both a pressure relief and vacuum venting valve. Many of the components are identical or virtually identical to those shown in FIGS. 1-7B. However, as best shown in FIGS. 10 and 11B, in this embodiment, the poppet 40a is modified to define at least one vent opening 110 in communication with the passageway, and the valve further includes a second poppet 120 dimensioned to close the vent opening(s) 110 in the poppet 40a, a stem 122 extending from the second poppet 120 and passing though a support opening 112 in the first poppet 40a, a stop 124 mounted on a distal end 126 of the stem 120; and a spring 130 compressed between the first poppet 40a and the stop 124, the spring biasing the second poppet 120 from an open position spaced from the first poppet 40a toward a closed position in abutting relationship with the first poppet 40a. The second poppet may carry a suitable valve seat 140, such as a suitable elastomeric O-ring, to facilitate sealing of the second poppet 120 with the first poppet 40a.

Accordingly, in the event that the pressure within the pressure vessel is sufficiently lower than the ambient pressure outside the pressure vessel, the pressure differential will cause the second poppet 120 to move (against the bias of spring 130) from the closed position toward the open position to admit ambient air to enter the pressure vessel through passageway 64 via the opening 110 in the first poppet 40a. When the pressure differential has been sufficiently reduced, the spring 130 will urge the second poppet 120 into the closed position, thereby thwarting the continued flow of fluid via the passageway 64.

Referring now to FIGS. 11A-13B, it is illustrated that the exemplary alternative spring capture assembly 90 includes at least the housing 10, spring 50, a spring retainer 70, and a tool 80 configured to mate and cooperate with the spring retainer 70 to compress the spring 60 within the housing 10.

Optionally, as in the embodiment shown in FIGS. 11A-13B, the spring retainer 70 is modified relative to that discussed above to include at least one axially extending leg 78 positioned to abut the poppet (which optionally is also modified to accommodate the leg as best shown in FIG. 9B) and space a portion of the spring retainer from the poppet 40a to permit fluid to pass therethrough for venting purposes. Further, the spring retainer 70 may include openings 75 to permit fluid to pass therethrough for venting purposes, as best shown in FIG. 10.

The tool 80 may be identical to the tools described above. Alternatively, either embodiment described above may be modified to provide that the distal end 84 of the tool's body 82 is centrally hollow to admit passage of at least a portion of the second poppet's stem 122, the stop 124, and optionally a portion of the spring 130, as will be appreciated from FIG. 11B.

Figure 14:
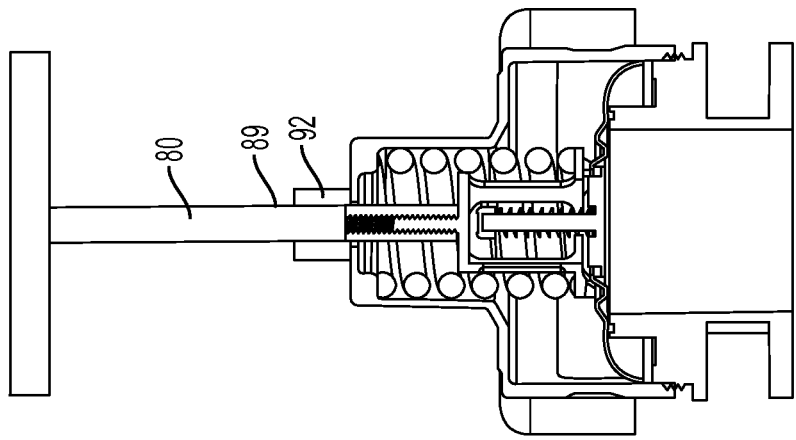
FIG. 14 is a cross-sectional view of an alternative embodiment of the valve of FIG. 10, shown with a spring retainer having an externally-threaded stud, mated with a tool having complementary internal threads, and a fixed shoulder.
Figure 15:
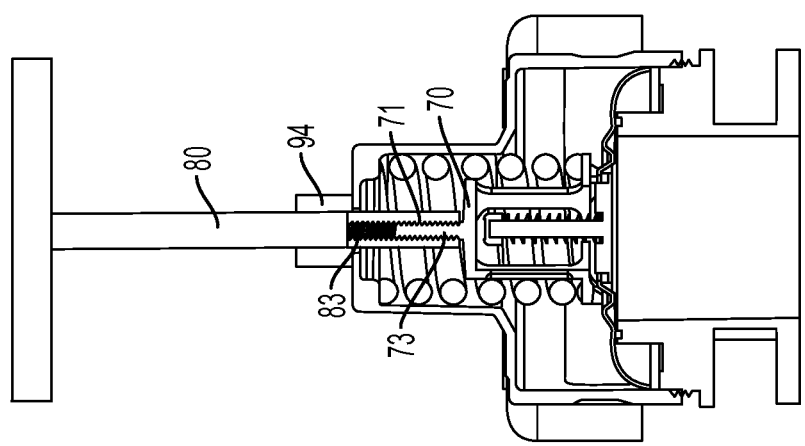
FIG. 15 is a cross-sectional view of an alternative embodiment of the valve of FIG. 10, shown with a spring retainer having an externally-threaded stud, mated with a tool having complementary internal threads, and a tool supporting a threaded nut.

Alternative embodiments are shown in FIGS. 14 and 15. Such alternative embodiments are similar to those discussed above with reference to FIGS. 8 and 9 in that the spring retainer 70 comprises external threads 71 on a stem 73 integral with the spring retainer 70, and the distal end of the tool 80 comprises complementary internal threads 83. In one such embodiment, the tool 80 further comprises a shoulder 94 for abutting the housing, as best shown in FIG. 14, and manipulating the tool 80 involves threading the tool 80 onto the stem 73 of the spring retainer 70 while the shoulder abuts the housing 10. In yet another alternative embodiment, the spring retainer 70 similarly comprises external threads 71 on a stem 73 integral with the spring retainer 70, and the distal end of the tool 80 comprises internal threads complementary thereto 83. However, in this alternative embodiment, a proximal end of the tool comprises external threads supporting a complementarily threaded nut 92 for abutting the housing, as shown in FIG. 15. In such an embodiment, manipulating the tool involves threading the tool onto the spring retainer and advancing the nut on the tool until the nut abuts the housing and draws up the spring retainer to compress the compression spring.

Figure 11B:
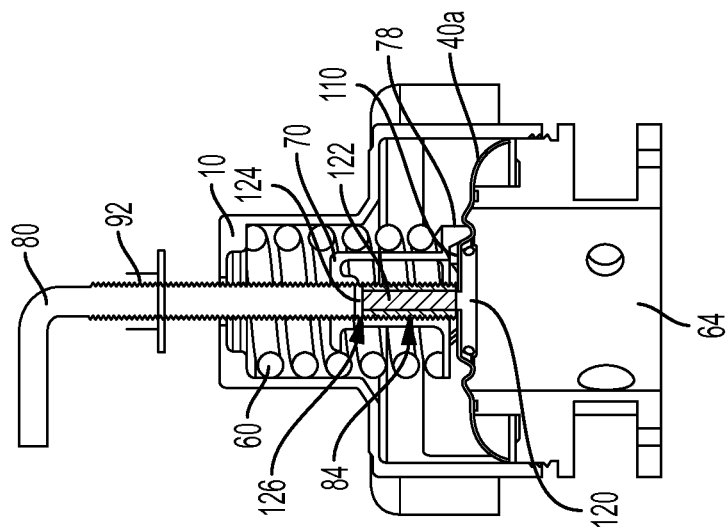
FIGS. 11A and 11B are elevational and cross-sectional views of the valve of FIG. 10, shown mated with a spring compression tool, and before compression of the spring.
Figure 11A:
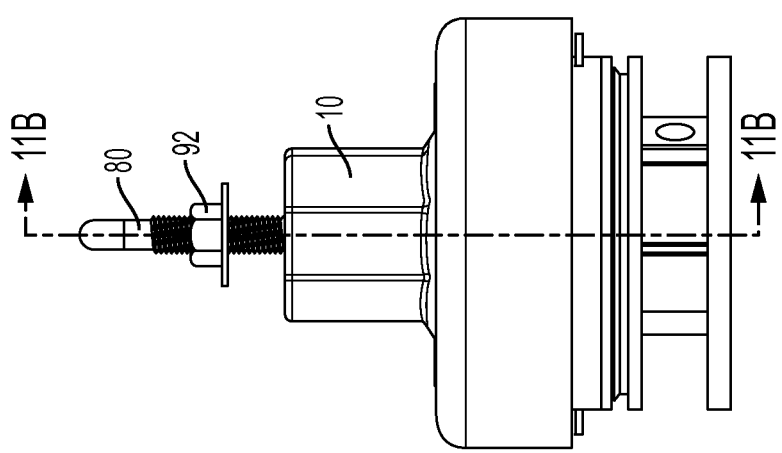
Figure 12B:
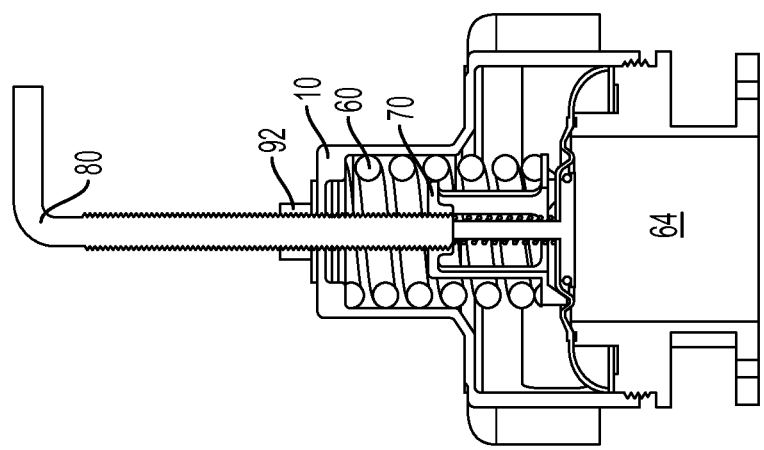
FIGS. 12A and 12B are elevational and cross-sectional views of the valve of FIG. 10, shown with a nut advanced against a housing in position to compress the spring.
Figure 12A:
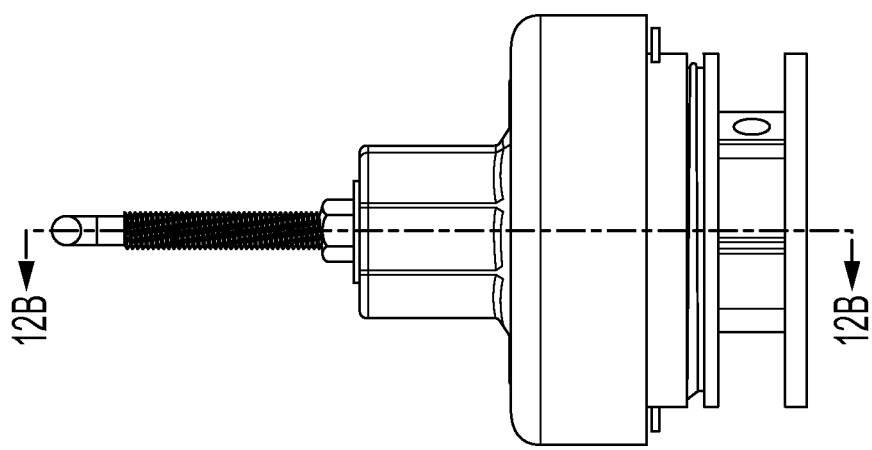
Figure 13B:
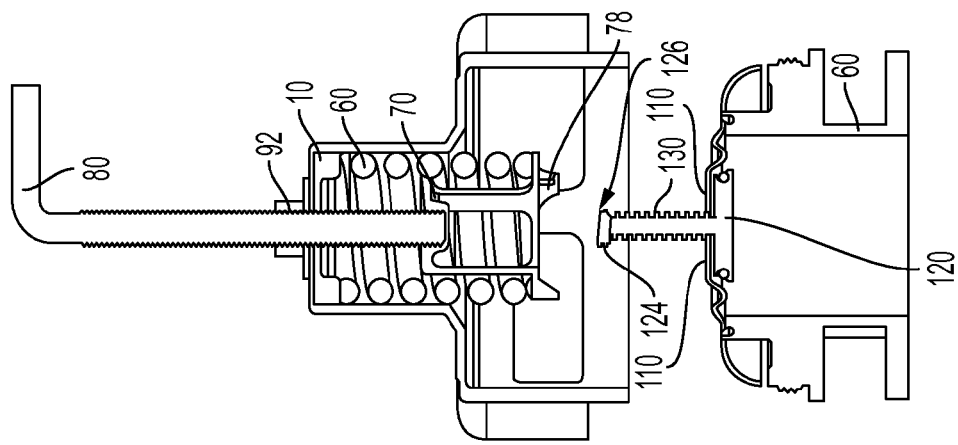
FIGS. 13A and 13B are elevational and cross-sectional views of the valve of FIG. 10, shown mated with a spring compression tool, and after compression of the spring, and showing the frame and spring assembly removed from the tank mount.
Figure 13A:
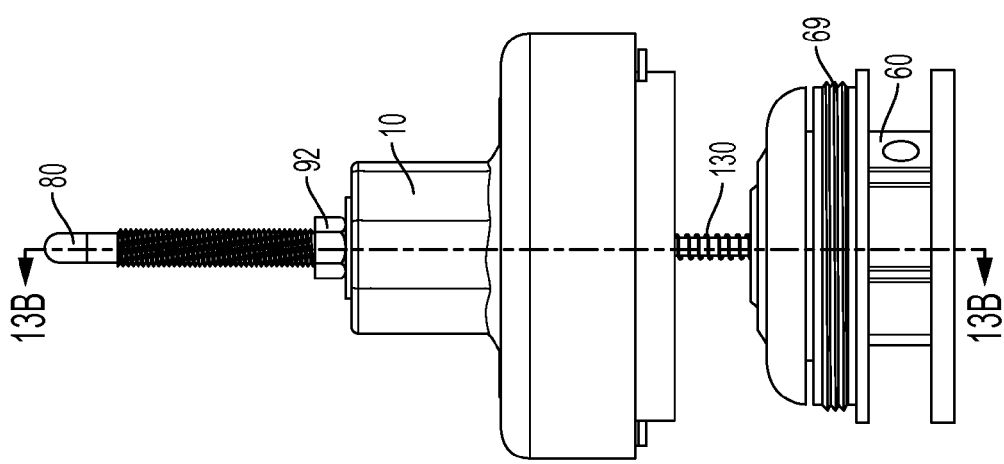

In use, the tool 80 is operable to mate with the spring retainer 70 and draw up the spring retainer 70 to compress the compression spring 50 between the spring retainer 70 and the housing 10 in a manner similar to those described above. By way of example, the tool 80 shown in FIGS. 9A-11B may be used as follows to disassemble the valve by threading the tool 80 into the spring retainer 70 (see FIG. 9B), tightening the nut 92 down against the housing 10 (see FIG. 10B), and then continuing to advance the nut 92 on the tool 80 to draw up the spring retainer 70 and compress the spring 50 to secure the spring between the spring retainer 70 and the housing 10, and relieve downward force on the poppet 40a, at which point the housing 10 may be safely and easily decoupled from the mount 60, as best shown in FIG. 11B. This exposes the poppets for service and/or cleaning, as best shown in FIG. 11B.

After cleaning/service, the poppets may be replaced on the valve seat 80/mount 60, the housing 10 may be secured to the mount 60 (e.g., by threading them together), and then the tool 80 can be rotated or otherwise decoupled from the spring retainer 70 to restore spring-bias to the valve/mechanism, and to return the valve/mechanism to service. The tool 80 may then be withdrawn from the housing 10 and the hole plug 34 may be replaced in the housing's opening 18.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A pressure relief valve for venting a pressure vessel containing a pressurized fluid, comprising:
   a mount, said mount having a lower portion adapted for mounting to the pressure vessel, a passageway for venting fluid therethrough, and an upper portion defining a first mating structure circumscribing said passageway;
   a valve seat supported on said mount about said passageway;
   a poppet matable with said valve seat to occlude said passageway and disrupt a flow of fluid therethrough, said poppet having an open position spaced from said valve seat and a closed position in abutting said valve seat;
   a housing having a first portion defining a second mating structure complementary to said first mating structure, and at least one vent to atmosphere configured such that, when said poppet is in said open position, said passageway is in fluid communication with said atmosphere, and an opening for admitting passage of a tool;
   a spring retainer having a mating structure mechanically interlockable with the tool, and a flange; and
   a compression spring mounted within said housing and captured at one end by said housing and at an opposite end by said flange of said spring retainer, said compression spring biasing said poppet from an open position spaced from said valve seat toward a closed position in abutting relationship with said valve seat, seat compression spring having an axis and said opening of said housing being aligned with said axis.

2. The pressure relief valve of claim 1, further comprising:
   a tool, said tool being an elongated member having a distal portion dimensioned to pass through said opening of said housing, said distal portion having a distal end matable with said mating structure of said spring retainer to compress said compression spring between said spring retainer and said housing.

3. The pressure relief valve of claim 2, wherein said opening of said spring retainer comprises internal threads, and wherein said distal end of said tool comprises external threads complementary thereto, said tool further comprising a shoulder for abutting said housing,
   whereby threading said tool through said spring retainer acts to draw up said spring retainer and compress said compression spring between said spring retainer and said housing.

4. The pressure relief valve of claim 2, wherein said opening of said spring retainer comprises internal threads, and wherein said distal end of said tool comprises external threads complementary thereto, and wherein a proximal end of said tool comprises external threads supporting a complementarily threaded nut,
   whereby threading said tool into said spring retainer and advancing said nut on said member acts to draw up said spring retainer and compress said compression spring between said spring retainer and said housing.

5. The pressure relief valve of claim 1, further comprising a plug dimensioned for removable positioning within said opening of said housing, to substantially occlude said opening.

6. The pressure relief valve of claim 1, wherein said poppet is provided with an anti-stick coating to prevent bonding to said valve seat.

7. The pressure relief valve of claim 1, wherein said poppet defines a vent opening in communication with said passageway, said pressure relief valve further comprising:
   a second poppet dimensioned to close said vent opening in said second poppet;
   a stem extending from said second poppet and passing though said poppet;
   a stop mounted on a distal end of said stem; and
   a second spring compressed between said first poppet and said stop, said second spring biasing said second poppet from an open position spaced from said second poppet toward a closed position in abutting relationship with said second poppet.

8. The pressure relief valve of claim 1, wherein said first mating structure comprises external threads, and wherein said second mating structure comprises complementary internal threads.

9. A spring capture assembly for a spring-biased mechanism comprising:
   a tool having an elongated member bearing threads, and supporting a complementarily threaded nut;
   a housing having an opening for admitting passage of said tool;
   a spring retainer mechanically interlockable to said tool; and
   a compression spring mounted within said housing and captured at one end by said housing and at an opposite end by said spring retainer, said compression spring having an axis and said opening of said housing being aligned with said axis;
   whereby rotation of said nut relative to said elongated member with said tool mated to said spring retainer and said nut abutting said housing withdraws the tool relative to the housing and acts to compress said compression spring between said spring retainer and said housing.

10. The spring capture assembly of claim 9, wherein elongated member has a distal end comprising threads, and said spring retainer comprises complementary threads for mechanically interlocking therewith.

11. The spring capture assembly of claim 9, wherein said spring retainer further comprises a flange positioned to engage a portion of said compression spring.

12. A method for disassembling a spring-biased mechanism having a spring capture assembly for capturing a compression spring of the mechanism, the method comprising:
   manually grasping an elongated tool having a distal end;
   inserting the distal end of the tool through a housing of the spring capture assembly;
   mating the distal end of the tool with a spring retainer of the spring capture assembly;
   manipulating the tool to draw up the spring retainer and compress the compression spring between the spring retainer and the housing;
   disassembling the spring-biased mechanism; and
   wherein disassembling the spring capture assembly from the spring-biased mechanism comprises rotating the housing of a spring-biased pressure relief valve relative to a mount of a pressure vessel to decouple complementary mating structures on the mount and on the housing.

13. The method of claim 12, wherein disassembling the spring-biased mechanism comprises disassembling the spring capture assembly from the spring-biased mechanism.

14. The method of claim 12, wherein the spring retainer comprises internal threads, the distal end of the tool comprises complementary external threads, and the tool further comprises a shoulder for abutting the housing, and wherein manipulating the tool comprises:
   threading the tool through the spring retainer while the shoulder abuts the housing.

15. The method of claim 12, wherein the spring retainer comprises external threads, the distal end of the tool comprises complementary internal threads, and the tool further comprises a shoulder for abutting the housing, and wherein manipulating the tool comprises:

threading the tool onto the spring retainer while the shoulder abuts the housing.

16. The method of claim 12, wherein the spring retainer comprises internal threads, the distal end of the tool comprises external threads complementary thereto, and a proximal end of the tool comprises external threads supporting a complementarily threaded nut, and wherein manipulating the tool comprises:

threading the tool into the spring retainer and advancing the nut on the tool until the nut abuts the housing and draws up the spring retainer to compress the compression spring.

17. The method of claim 12, wherein the spring retainer comprises external threads, the distal end of the tool comprises internal threads complementary thereto, and a proximal end of the tool comprises external threads supporting a complementarily threaded nut, and wherein manipulating the tool comprises:

threading the tool onto the spring retainer and advancing the nut on the tool until the nut abuts the housing and draws up the spring retainer to compress the compression spring.

18. A pressure relief valve for venting a pressure vessel containing a pressurized fluid, comprising:

a mount having a lower portion adapted for mounting to the pressure vessel, a passageway for venting fluid therethrough, and an upper portion defining a first mating structure circumscribing said passageway;

a valve seat supported on said mount about said passageway;

a poppet matable with said valve seat to occlude said passageway and disrupt a flow of fluid therethrough, said poppet having an open position spaced from said valve seat and a closed position in abutting said valve seat;

a housing having a second mating structure interengaged with said first mating structure, said housing having a top portion defining an opening and an internal passageway, said housing defining at least one vent to atmosphere configured such that, when said poppet is in said open position, said passageway is in fluid communication with said atmosphere;

a spring retainer comprising a flange and a first threaded portion axially aligned with said opening, said internal passageway extending at least from said opening to said first threaded portion;

said compression spring mounted within said housing and captured at one end by said housing and at an opposite end by said flange of said spring retainer, said compression spring biasing said poppet from an open position spaced from said valve seat toward a closed position in abutting relationship with said valve seat; and a threaded member disposed in said opening and along said internal passageway, said threaded member comprising a second threaded portion in threaded engagement with said first threaded portion, said threaded member comprising a shoulder portion contacting said top portion, said threaded member being configured such that rotating said threaded member causes said shoulder to urge against said top portion and move said first threaded portion axially relative to said second treaded portion, thereby causing said spring retainer to move relative to said housing.

19. The pressure relief valve of claim 18, wherein said compression spring encircles said internal passageway.

20. The pressure relief valve of claim 18, wherein said threaded member is removable.

21. The pressure relief valve of claim 20, wherein said threaded member is a tool.

22. The pressure relief valve of claim 18, wherein said second threaded portion comprises external treads.

23. The pressure relief valve of claim 18, wherein said poppet and said retainer are discrete components such that causing said spring retainer to move with said threaded member will not cause said poppet to move.

24. The pressure relief valve of claim 18, wherein said poppet and said retainer are discrete components such that causing said spring retainer to move with said tool will not cause said poppet to move.

* * * * *

UNITED STATES PATENT AND TRADEMARK OFFICE
CERTIFICATE OF CORRECTION

| | | |
|---|---|---|
| PATENT NO. | : 9,121,523 B2 | Page 1 of 1 |
| APPLICATION NO. | : 13/155846 | |
| DATED | : September 1, 2015 | |
| INVENTOR(S) | : Girard et al. | |

It is certified that error appears in the above-identified patent and that said Letters Patent is hereby corrected as shown below:

In the Claims

Column 11, Claim 1, lines 27-28, "seat compression" should read -- said compression --.

Column 14, Claim 24, line 38, "claim 18" should read -- claim 1 --.

Signed and Sealed this
Fifteenth Day of March, 2016

Michelle K. Lee
*Director of the United States Patent and Trademark Office*